Patented Dec. 17, 1940

2,224,964

UNITED STATES PATENT OFFICE 2,224,964

MANUFACTURE OF AROMATIC SULPHONES

Johann Huismann, Leverkusen-Wiesdorf, Germany, assignor, by mesne assignments, to General Aniline & Film Corporation, New York, N. Y., a corporation of Delaware No Drawing. Application July 3, 1939, Serial No. 282,737. In Germany July 23, 1938

1 Claim. (Cl. 260—607)

The present invention relates to a process for manufacturing aromatic sulphones.

According to my invention, aromatic sulphochlorides are heated, in the absence of water, with aromatic hydrocarbons or oxides of aromatic hydrocarbons in the presence of small quantities of iron chloride. The aromatic sulphochlorides as well as the hydrocarbons or oxides of hydrocarbons may be substituted by alkyl-, halogen-, and nitro groups. If in such cases the hydrocarbons or oxides of hydrocarbons are substituted by strongly negative substituents, for instance, by several halogen atoms or by a nitro group, the condensation generally proceeds less easily and quantitatively. Hydrocarbons with two aromatic rings, such as diphenyl or naphthalene, or oxides such as diphenyl oxide or diphenylene oxide, may react one or several times with the aromatic sulphochloride, depending on reaction condition.

In the condensation described the action of the iron chloride is a catalytic one. The condensation may be carried out, therefore, with very small quantities of iron chloride, being much less than equimolecular quantities. Hereby this process is completely distinguished from the aluminium chloride process (Friedel-Crafts reaction), according to which aromatic sulphones have been produced by the condensation of aromatic sulphochlorides with aromatic hydrocarbons. In the aluminium chloride synthesis, aluminium chloride must be employed in equimolecular quantities. In such small quantities as the iron chloride can be used in the present reaction, aluminium chloride is practically without any effect. Moreover, it has already been proposed to condense benzoyl chloride with benzene in the presence of iron chloride. But also in this reaction great quantities of iron chloride are used, and there is formed an addition product which contains great quantities of iron chloride.

In view thereof it could not be expected that iron chloride in catalytic quantities would promote the condensation of aromatic sulphochlorides with aromatic hydrocarbons so much that the corresponding sulphones could be obtained in excellent yield. Since the complicated working up of the reaction mixture is avoided which is necessary when working according to the Friedel-Craft process, in order to decompose the aluminium chloride, the present process is obviously a considerable advance in the art.

The invention is further illustrated by the following examples, the parts being by weight.

Example 1

185 parts of benzenesulphochloride having been refined by distillation in vacuo are heated to a temperature of about 80° C. in a reflux condenser together with 78 parts of dried benzene. About 1–2 parts of sublimated iron chloride are introduced to the well stirred mixture. Immediately hydrogen chloride begins to evolve rapidly. The evolution of hydrogen chloride continues for 2 hours with diminishing strength. Finally the melt is heated for some hours to a temperature of about 110° C., mixed with hot water and treated for some time with water vapor. Hereby the excess benzenesulphochloride is saponified and the resulting diphenylsulphone may be filtered with suction from the cooled aqueous suspension, washed with cold water and thereupon dried. The resulting raw-product yields, by recrystallizing from alcohol, the pure diphenylsulphone (melting point 122.5–123.5° C.) in a yield of about 80%.

Example 2

194 parts of benzenesulphochloride which have been distillated in vacuo are heated to a temperature of about 90° C. in a reflux condenser together with 112.5 parts of dried chlorobenzene. About 1–2 parts of sublimated iron chloride are introduced into the well stirred mixture. Immediately hydrogen chloride begins to evolve rapidly. The evolution of hydrogen chloride continues for 8 hours with slowly diminishing strength. In the course of several hours the melt is gradually heated to a temperature of about 120° C. and, if the evolution of hydrogen chloride has stopped, the reaction mixture is treated for some time with water vapor. Hereby the excess benzenesulphochloride is saponified, and any chlorobenzene which has not reacted distils over together with water vapor. The remaining aqueous suspension is cooled, filtered with suction and the condensation product, obtained in the form of a white powder, is washed with cold water and thereupon dried. The raw product is obtained in a yield of more than 90%. By recrystallizing from alcohol the 4-chloro-diphenylsulphone (melting point 94–95° C.) is obtained in a yield of about 80%.

The condensation of benzenesulphochloride and bromobenzene, which cannot be effected by the aluminium chloride method according to the literature (Berichte d. deutsch. Chem.-Ges., vol. 11, page 2066, and so on), proceeds in entirely the same manner as the condensation of benzenesulphochloride and chlorobenzene as described in this example. The 4-bromodiphenylsulphone is immediately obtained in a yield of 85% and in nearly pure form. It can be obtained by recrystallizing from alcohol in a yield of 75% of the pure product (melting point 107–107.5° C.).

*Example 3*

210 parts of o-toluenesulphochloride which have been distillated under a diminished pressure are heated to a temperature of about 85° C. in a reflux condenser together with 92 parts of dried toluene. 1–2 parts of sublimated iron chloride are introduced into the well stirred mixture. Immediately hydrogen chloride begins to evolve rapidly. The evolution of hydrogen chloride continues for 1 hour in a similar strength and thereupon begins to diminish slowly. Finally the melt is heated for several hours to a temperature of 100–110° C. and, if the evolution of hydrogen chloride has stopped, mixed with hot water. This mixture is treated for some time with water vapor. On cooling of the aqueous suspension the reaction product does not solidify. The aqueous solution is removed and the resinous residue is taken up with ether. The ether solution is dried with calcium chloride and filtered and the ether thereupon distilled off. The remaining reaction product is a thickly liquid oil which distils at 203–206° C. at a pressure of 3–4 mm./Hg. The product thus refined is probably of the formula:

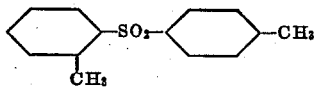

and is obtained in a yield of about 70%.

In a condensation which is analogous to the foregoing, it is possible, for instance, to produce 2-methyldiphenylsulphone (melting point: 67–68° C.) from o-toluenesulphochloride and benzene in about theoretical yield.

*Example 4*

210 parts of dried p-toluenesulphochloride are heated to a temperature of about 80° C. in a reflux condenser together with 78 parts of dried benzene. 1–2 parts of sublimated iron chloride are introduced into the well stirred mixture. Immediately hydrogen chloride begins to evolve rapidly. The evolution of hydrogen chloride continues for about 1 hour and thereupon begins to diminish. By slowly heating to a temperature of 100–110° C. the mixture becomes more and more thickly liquid and finally solidifies. If the evolution of hydrogen chloride has stopped, the reaction product is mixed with hot water and the aqueous emulsion is treated for some time with water vapor. Thereupon the mixture is cooled and the condensation product being of granular shape is separated from the aqueous mixture by filtering with suction and recrystallized from alcohol. The pure 4-methyl-diphenylsulphone of the melting point of 127° C. is obtained in a yield of about 80%.

*Example 5*

232 parts of o-chlorobenzenesulphochloride having been refined by distillating in vacuo are heated while stirring to a temperature of about 80° C. in a reflux condenser together with 78 parts of dried benzene. Thereupon about 1–2 parts of sublimated iron chloride are introduced. Immediately an evolution of hydrogen chloride begins rapidly and continues for more than 2 hours in a similar strength. The mixture is heated to a temperature of about 110° C. until the evolution of hydrogen chloride has stopped. The reaction product is mixed with hot water as usual and treated with water vapor for some time in order to destroy the excess of unreacted chlorobenzenesulphochloride. When cooling the oily mixture the reaction product solidifies and may be filtered with suction, pulverized and washed with cold water. After having been recrystallized from alcohol the 2-chlorodiphenylsulphone melting at 105° C. is obtained in a yield of about 75%.

*Example 6*

232 parts of o-chlorobenzenesulphochloride, refined by distillation, are heated while stirring continually to a temperature of about 110–120° C. in a reflux condenser with 147 parts of 1,2-dichlorobenzene. 1–2 parts of sublimated iron chloride are introduced into this mixture. Immediately hydrogen chloride begins to evolve rapidly. This evolution continues for several hours with diminishing strength. Thereupon the mixture is heated to a temperature of about 130–140° C. while stirring until the evolution of hydrogen chloride has stopped. The reaction product is mixed with water as usual and treated for some time with water vapor. Hereby the unreacted sulphochloride is saponified and any unreacted dichlorobenzene distills over together with the water vapor. The crude 2-chloro-3',4'-dichlorodiphenylsulphone is obtained in a yield of about 70% and the pure product, recrystallized from alcohol and melting at 135° C., in a yield of about 50%.

In a similar way, the 2-chloro-4'-chlorodiphenylsulphone (melting point: 101° C.) is obtained by condensation of 2-chlorobenzenesulphochloride with chlorobenzene, and the 2-chloro-2',5'-dichlorodiphenylsulphone (melting point: 140.5) by condensation of 2-chlorobenzenesulphochloride with 1,4-dichlorobenzene.

*Example 7*

232 parts of p-chlorobenzenesulphochloride refined by distillation are heated to a temperature of about 100° C. in a reflux condenser together with 112.5 parts of chlorobenzene. 1–2 parts of sublimated iron chloride are introduced into this mixture. Immediately hydrogen chloride begins to evolve rapidly. This evolution continues for several hours at a temperature of the mixture of 100–120° C. If the evolution of hydrogen chloride has stopped, the mixture is mixed with hot water and water vapor is passed through the oily emulsion for some time. By the water vapor the unreacted chlorobenzenesulphochloride is saponified. From the cooled aqueous suspension the reaction product may be filtered with suction in granular form. By recrystallizing from alcohol the pure 4,4'-dichlorodiphenylsulphone (melting point: 147.5° C.) is obtained in a yield of about 75%.

In an analogous way, the 4-chlorodiphenylsulphone (as already described in Example 2) can be obtained in an excellent yield from 4-chlorobenzenesulphochloride and benzene, and 4-chloro-3',4'-dichlorodiphenylsulphone (melting point: 118° C.) from 4-chlorobenzenesulphochloride and 1,2-dichlorobenzene, as well as the 4-chloro-2',5'-dichlorodiphenylsulphone (melting point: about 153° C.) from 4-chlorobenzenesulphochloride and 1,4-dichlorobenzene.

*Example 8*

270 parts of 1,2-dichlorobenzene-4-sulphochloride having been distilled under reduced pressure are heated with 78 parts of benzene to about 80° C. at the reflux condenser, while stirring. 1-2 parts of sublimated iron chloride are added. Immediately hydrogen chloride begins to evolve rapidly for several hours. At last the temperature of the reaction mixture is raised for some time to 110-120° C. until the evolution of hydrogen chloride has stopped. The melt is worked up as usual with hot water and water vapor. The raw-product is obtained in a nearly theoretical yield. By recrystallizing from alcohol, the pure 3.4-dichlorodiphenylsulphone (melting point: 125° C.) is obtained in a yield of about 70%.

In an analogous way, the 4-chloro-3′,4′-diphenylsulphone (as described in Example 7) can be obtained by condensing 1,2-dichlorobenzene-4-sulphochloride with chlorobenzene in a good yield, and also the 3,4,3′,4′-tetrachloridediphenylsulphone (melting point: 173° C.) by condensing 1,2-dichlorobenzene-4-sulphochloride with 1.2-dichlorobenzene.

*Example 9*

270 parts of 1,4-dichlorobenzene-2-sulphochloride having been distillated in vacuo are heated, while stirring, to a temperature of about 80° C. in a reflux condenser together with 78 parts of benzene. About 1-2 parts of sublimated iron chloride are thereupon added. Hydrogen chloride begins to evolve for some time during which the temperature of the reaction mixture is gradually raised to 120° C. The melt becomes more and more viscous and finally solidifies. The reaction product is worked up as usual with hot water and water vapor. The raw-product is obtained in about the theoretical yield. By recrystallizing from alcohol, the pure 2,5-dichlorodiphenylsulphone (melting point: 146° C.) is obtained in a yield of about 75%.

*Example 10*

244 parts of 3-nitrobenzenesulphochloride having been refined by distilling in high vacuum are heated to about 80° C. in a reflux condenser, while stirring, together with 78 parts of benzene. About 1-2 parts of sublimated iron chloride are added. An evolution of hydrogen chloride begins immediately and continues for several hours with diminishing strength. Thereupon the temperature of the mixture is slowly raised to 110° C. and the viscous oil obtained in this manner is mixed with hot water. After distilling as usual with water vapor there remains a residue which is at first plastic, but solidifies on washing with cold water. By recrystallizing from alcohol, the 3-nitrodiphenylsulphone (melting point: 85° C.) is obtained in a yield of about 75%.

In an analogous way, the 3-nitro-4′-chlorodiphenylsulphone (melting point: 138° C.) may be obtained by condensing 3-nitrobenzenesulphochloride with chlorobenzene, or the 3-nitro-3′,4′-dichlorodiphenylsulphone (melting point: 125° C.) by condensing 3-nitrobenzenesulphochloride with 1,2-dichlorobenzene; the condensation of 3-nitrobenzenesulphochloride with 1,4-dichlorobenzene, yielding the 3-nitro-2′.5′-dichlorodiphenylsulphone (melting point: 133° C.) proceeds somewhat more difficultly and gives a smaller yield.

*Example 11*

244 parts of 4-nitrobenzenesulphochloride having been distilled in a high vacuum are heated to a temperature of about 80° C. in a reflux condenser, while stirring, together with 78 parts of benzene. After 1-2 parts of sublimated iron chloride have been added an evolution of hydrogen chloride immediately begins and continues for some time with diminishing strength. The temperature of the reaction mixture is gradually raised to about 110° C. and is kept at this value until the evolution of hydrogen chloride has entirely stopped. The mass, which solidifies on cooling, is mixed with hot water and treated for some time with water vapor. The raw-product is obtained by filtering with suction and is re-crystallized from alcohol. The pure 4-nitrodiphenylsulphone (melting point: 140° C.) is obtained in a yield of about 70%.

*Example 12*

282 parts of 4-nitro-1-chlorobenzene-2-sulphochloride having been distilled in a high vacuum are heated to a temperature of about 90° C. in a reflux condenser, while stirring, together with 78 parts of benzene. After 1-2 parts of sublimated iron chloride have been added, there begins an evolution of hydrogen chloride which continues for several hours with diminishing strength. While the reaction mixture gradually turns more and more viscous, the inner temperature is slowly raised to about 120° C. and kept at this value until the evolution of hydrogen chloride has entirely stopped. The condensation product which has solidified in the reaction vessel is mixed with hot water and treated for some time with water vapor in order to saponify as completely as possible the excess nitrochlorobenzenesulphochloride. Thereupon the cooled aqueous suspension is filtered with suction and the resulting product is purified by mixing with methyl alcohol and filtering the methylalcoholic suspension. The dried 5-nitro-2-chlorodiphenylsulphone (melting point: 173° C.), when recrystallized from chlorobenzene, is obtained in a yield of more than 80%.

In an analogous way, there may be obtained, for instance, the 3-nitro-4-chlorodiphenylsulphone (melting point: 127.5° C.) in an excellent yield by condensing 2-nitro-1-chlorobenzene-4-sulphochloride and benzene.

*Example 13*

259 parts of 2-nitrotoluene-4-sulphochloride being distilled in a high vacuum are heated to a temperature of about 80° C. in a reflux condenser, while stirring, together with 78 parts of benzene. After 1-2 parts of sublimated iron chloride have been added, an evolution of hydrogen chloride immediately begins and continues for several hours with diminishing strength. Finally the temperature of the mixture is gradually increased to about 120° C. and the resulting reaction mixture is treated with hot water and water vapor. The condensation product being isolated by filtering with suction from the cooled aqueous mixture is obtained after drying in a yield of about 95%.

In an analogous way and in an equal yield there is obtained, for instance, the 5-nitro-2-methyldiphenylsulphone (melting point: 159° C.) by condensing 4-nitrotoluene-2-sulphochloride with benzene.

*Example 14*

176.5 parts of distilled benzene sulphochloride are heated in a stirring apparatus at the reflux condenser to about 110° C. together with 137 parts of 2-nitrotoluene. On adding about 1-2 parts of sublimated iron chloride a slow evolution of hydrogen chloride begins, which continues for several hours. When the reaction has slowed down at 120–130° C., the oily reaction product is treated as usual with hot water and water vapor. Large quantities of nitrotoluene distilling with the water vapor indicate that the mixture did not react completely. The 3-nitro-4-methyl-diphenylsulphone already mentioned in Example 13, is obtained.

*Example 15*

176.5 parts of distilled benzene sulphochloride are heated in a reflux condenser to about 80° C. together with 154 parts of diphenyl. After the addition of 1–2 parts of sublimated iron chloride, immediately hydrogen chloride begins to evolve rapidly and, on raising the temperature slowly to 100° C., continues in similar strength for more than one hour. Thereafter the reaction begins to slow down while at the same time the melt becomes more and more viscous and finally solidifies. After the evolution of hydrogen chloride has stopped, the reaction mass is treated for some time with hot water and water vapor, and the condensation product is filtered with suction from the cooled suspension. It is treated with cold alcohol, again filtered and dried. The raw-product is recrystallized from hot alcohol. The pure product (melting point: 148° C.), probably of the following formula:

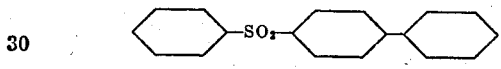

is obtained in a yield of more than 70%.

*Example 16*

388 parts of distilled benzene sulphochloride are heated at the reflux condenser, while stirring, to about 80° C. together with 154 parts of diphenyl. By the addition of 1–2 parts of sublimated iron chloride, immediately hydrogen chloride begins to evolve rapidly, continuing in an equal strength for several hours. The temperature is slowly raised to about 140° C. The mixture becomes more and more viscous and solidifies after about 7 hours. After the evolution of hydrogen chloride has stopped, the solidified mass is treated with hot water and with water vapor for some time. The raw-product is filtered, treated with alcohol, again filtered and thereupon dried; it may be recrystallized from nitrobenzene without any important loss and is obtained in a yield of about 90%. The pure disulphone of the formula:

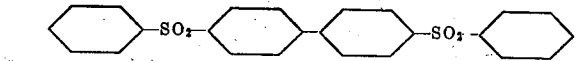

has a melting point of 299° C.

*Example 17*

185 parts of distilled benzene sulphochloride are heated at the reflux condenser, while stirring, to about 70° C. together with 128 parts of naphthalene. By the addition of 1–2 parts of sublimated iron chloride to the melt, immediately an evolution of hydrogen chloride begins rapidly, which continues for about half an hour in the same length and thereupon diminishes. The temperature is gradually increased to 120° C., and the mixture is treated with hot water and with water vapor for some time. The aqueous suspension is cooled, the aqueous solution removed, and the pasty raw-product treated several times with hot water and dried in vacuo. The product may be refined by distilling in a high vacuum. Thereby the greater part of the condensation product distils over under a pressure of 0.5 mm. Hg at a temperature of about 213–214° C. The distillate, obtained in a yield of about 80%, represents at room temperature a thickly liquid oil which solidifies after some days; by recrystallizing from methyl alcohol, crystals of phenyl-α-naphthylsulphone (melting point: about 98–99° C.) are obtained.

*Example 18*

370 parts of benzene sulphochloride are heated at the reflux condenser, while stirring, to about 70° C. together with 128 parts of naphthalene. On the addition of 1–2 parts of sublimated iron chloride, immediately an evolution of hydrogen chloride begins rapidly being combined at the beginning with a perceptible rise in temperature. After about 6 hours, during which the temperature has been increased to about 110° C., the melt, which continues to evolve hydrogen chloride rapidly, is becoming more and more viscous and after a short time solidifies. Thereupon it is heated to about 140° C. for some hours and the powdered raw-product which has been taken from the reaction vessel is treated for some time with hot water and water vapor. The dried product is taken up in boiling chlorobenzene. From the solution in chlorobenzene, a product crystallizes which after having been recrystallized from chlorobenzene, melts at 184–185° C. and probably represents the naphthalene1,8-diphenyldisulphone (theoretical yield: 60%) of the formula:

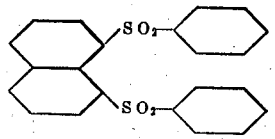

The residue remaining when the raw-product is extracted with chlorobenzene can be dissolved in nitrobenzene. From the nitrobenzene solution, there crystallizes a compound which, after having been recrystallized from nitrobenzene, melts at 275–276° C. and probably is the pure naphthalene-1,5-diphenyldisulfone of the formula:

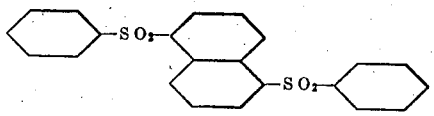

*Example 19*

240 parts of naphthalene-β-sulphochloride are heated at the reflux condenser, while stirring, to about 80° C. together with 128 parts of naphthalene. By the addition of 1–2 parts of sublimated iron chloride, there immediately begins a rapid evolution of hydrogen chloride continuing for 2 hours with diminishing strength. The temperature of the reaction mixture is maintained at 90–100° C. for some hours, whereupon the melt, which has become viscous and has stopped to evolve hydrogen chloride, is treated for some time with hot water and water vapor. Thereupon the aqueous solution is separated from the fused reaction product having been solidified by cooling; the reaction product is now dried and distilled in vacuo. At a temperature of 292–302° C. and a pressure of 3–4 mm. Hg more than 90% of the raw-product distil over. The distillate solidifies at usual temperatures to a clear hard pulverable resin which is easily soluble in organic solvents, such as alcohol, benzene or chlorobenzene. By recrystallizing from alcohol or chlorobenzene, crystals are obtained which by recrystallizing once more have the melting point of α-β-dinaphthalsulphone (121–122° C.).

Example 20

275 parts of benzene-1,3-disulphochloride are heated in a reflux condenser while stirring to about 80° C. together with 172 parts of benzene. By adding 1–2 parts of sublimated iron chloride immediately begins an evolution of hydrogen chloride; it continues for more than 24 hours during which the temperature is slowly raised to 100° C. If the evolution of hydrogen chloride has nearly stopped, the melt which has become viscous is mixed with hot water and treated with water vapor for some time. The condensation product may be filtered from the cooled aqueous liquid, washed with water and thereupon dried. After having been recrystallized from chlorobenzene, the disulphone of the formula:

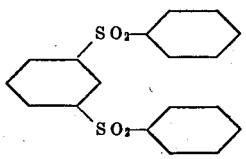

melts at 187–188° C. Before recrystallizing the product is present in a yield of about 85%, and after recrystallizing in a yield of about 70%.

Example 21

186 parts of distilled benzenesulphochloride are heated in a reflux condenser, while stirring, to about 70° C. together with 170 parts of dried pure diphenyloxide. By adding 1–2 parts of sublimated iron chloride, immediately an evolution of hydrogen chloride begins rapidly, continuing 2–3 hours. The temperature is kept at 110–120° C. for some hours, whereupon the liquid melt is treated with hot water and water vapor for some time. The pasty residue is separated from the aqueous solution and taken up; the ether solution is dried with calcium chloride and the ether is distilled off. The crude residue being obtained in a yield of more than 90% is distilled in vacuo; the condensation product of the probable formula:

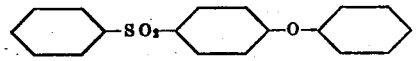

distils at a pressure of 1 mm. Hg. and a temperature of about 238–240° C. It represents a clear oil which is highly viscous at ordinary temperature and solidifies after some time (melting point: 77° C.).

Example 22

186 parts of distilled benzenesulphochloride are heated in a reflux condenser, while stirring, to about 80° C. together with 168 parts of diphenyloxide. By adding 1–2 parts of sublimated iron chloride, immediately an evolution of hydrogen chloride begins rapidly, continuing in the same strength for about one hour. The condensation product which has finally solidified is pulverized and treated for some time with hot water and water vapor. Thereupon the condensation product is washed with cold water and recrystallized from alcohol. The product of the probable formula:

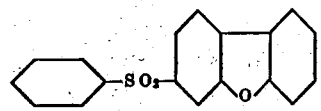

has a melting point of 166° C. and is obtained in an excellent yield.

I claim:

A process for preparing aromatic sulphones by causing an aromatic sulphochloride selected from the group consisting of an unsubstituted aromatic sulphochloride and an alkyl, halogen and nitro substituted aromatic sulphochloride to react, in the presence of iron chloride as a catalyst, with a compound of the group consisting of aromatic hydrocarbons, alkyl, halogen and nitro substituted aromatic hydrocarbons and the oxides thereof.

JOHANN HUISMANN.